United States Patent [19]

Hunter

[11] Patent Number: 5,383,714

[45] Date of Patent: Jan. 24, 1995

[54] VEHICLE HAVING DUMP BED

[76] Inventor: H. Victor Hunter, R.R. 4, Box 209, Butler, Mo. 64730

[21] Appl. No.: 973,426

[22] Filed: Nov. 9, 1992

[51] Int. Cl.$^6$ .............................................. B60P 1/16
[52] U.S. Cl. ...................... 298/17 R; 92/13.4; 92/13.7; 298/22 C; 298/22 R; 414/24.5
[58] Field of Search ............... 298/1 A, 17 B, 19 B, 298/22 R, 17 S, 22 C; 414/24.5; 92/13.4, 13.5, 13.7

[56] References Cited

U.S. PATENT DOCUMENTS

| | | | |
|---|---|---|---|
| 2,569,038 | 9/1951 | Day | 298/22 R X |
| 2,640,725 | 6/1953 | Dale | 298/1 A |
| 3,355,043 | 11/1967 | Talbert | 298/22 R X |
| 3,871,706 | 3/1975 | Odom | 298/1 A |
| 3,896,956 | 7/1975 | Hostetler | 414/24.5 |
| 4,766,803 | 8/1988 | Cartee et al. | 92/13.4 |

FOREIGN PATENT DOCUMENTS

| | | | |
|---|---|---|---|
| 1011297 | 5/1977 | Canada | 414/24.5 |
| 959884 | 3/1957 | Germany | |

Primary Examiner—Michael S. Huppert
Assistant Examiner—Janice L. Krizek
Attorney, Agent, or Firm—Shook, Hardy & Bacon

[57] ABSTRACT

A vehicle is provided with a dump bed which can be pivoted from a horizontal orientation to a fully upright position to facilitate loading of material onto the dump bed and unloading material therefrom. A hydraulic or other type cylinder is used to raise and lower the dump bed. The cylinder is oriented at an acute angle from the horizontal and is attached at one end to a rear portion of the dump bed. The other end of the cylinder is attached to a crossbeam at a forward location. The dump bed includes downward extending arms and extensions that carry pivot pins about which the dump bed rotates. The location of the pivot axis in this manner creates a crank arm that provides the cylinder with the leverage necessary to raise the dump bed.

16 Claims, 2 Drawing Sheets

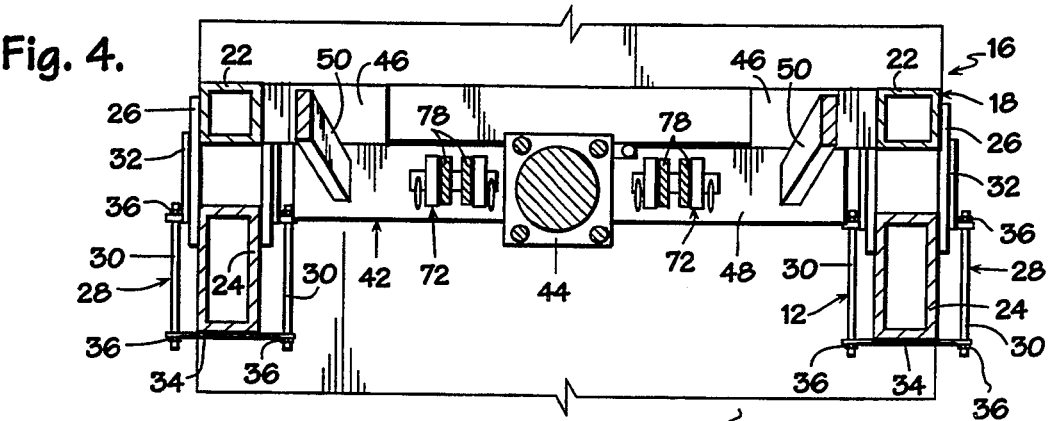
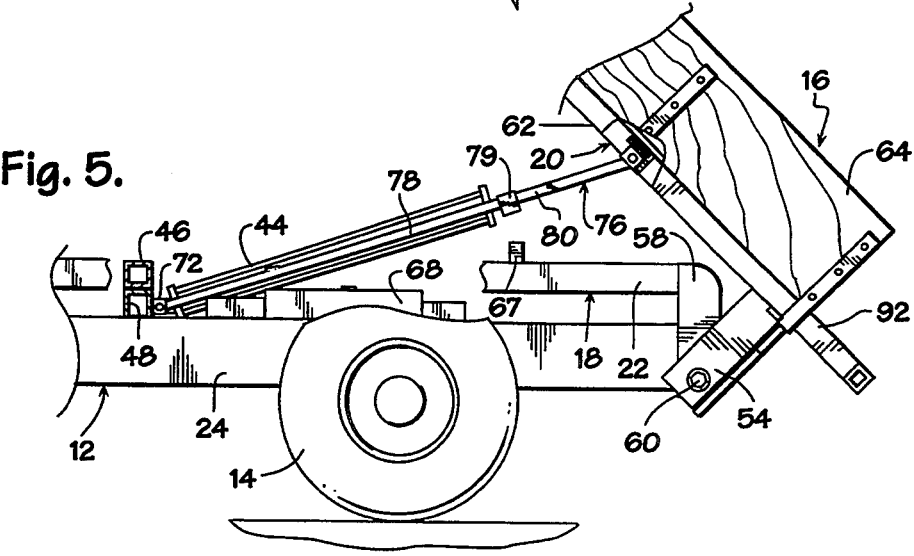
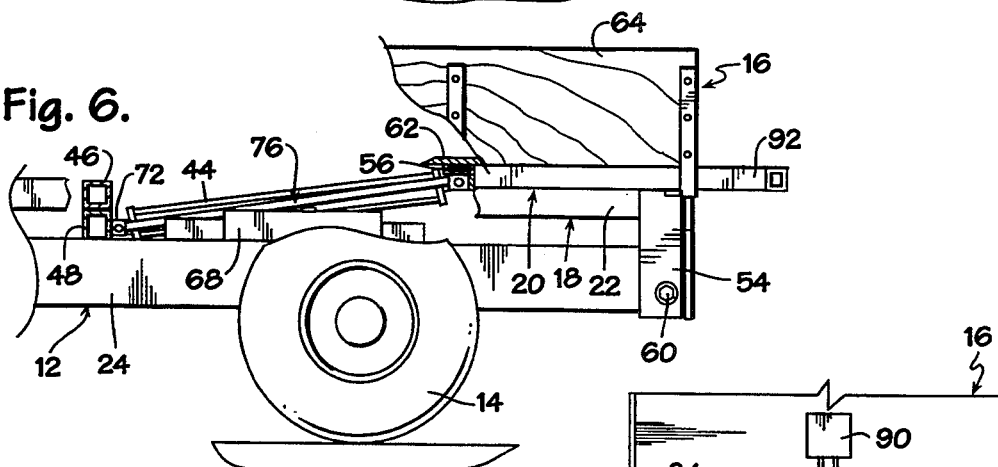
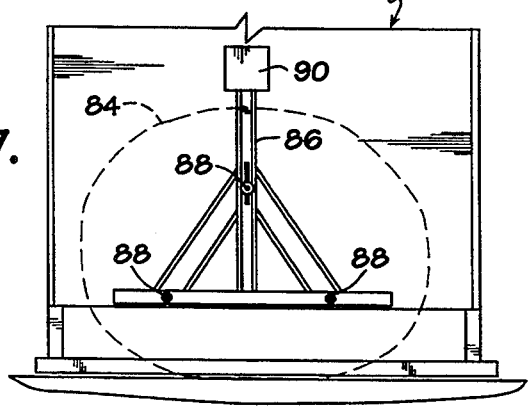

VEHICLE HAVING DUMP BED

BACKGROUND OF THE INVENTION

This invention relates in general to vehicles, and, more particularly, to trucks having a dump bed which can be elevated at a forward end to dump material which is loaded on the bed.

A variety of trucks utilize a dump bed which is pivotally mounted at the trailing end and is connected to an extensible cylinder at a forward end. Extension of the cylinder raises the forward end of the dump bed to cause the material carried on the bed to slide rearwardly off of the bed. When the dump bed is to be returned to its normal horizontal position, the cylinder actuating force is simply released and the weight of the dump bed causes retraction of the cylinder and lowering of the bed.

While the dump beds of the type described are suitable for dumping loads of free-flowing particulate material such as sand and gravel, other materials such as mud and asphalt can be difficult to remove because they have a tendency to stick together in a single mass and adhere to the bed surface. Removal of such materials often requires the truck operator to move the vehicle forwardly in a lurching motion which separates the material from the bed but also subjects the various components of the dumping mechanism to large stresses which can cause twisting and eventual fracturing of one or more components.

Certain types of dump beds are designed so that the bed can be elevated to an angle greater than 45 degrees to facilitate removal of material from the bed. Because the cylinder which causes elevation of the bed is normally connected to the forward end of the bed, the cylinder must have an exceedingly long stroke in order to move the bed through an angle of 45 degrees or more. Although multi-stage cylinders can be used to provide the desired stroke, they tend to be much more expensive than single-stage, single acting cylinders.

In addition to the increased costs associated with the types of cylinders required to move the bed through a large angle of movement, such dump beds tend to be very unstable when the bed is fully raised because the pivot axis is usually located immediately below the undersurface of the bed. This location of the pivot axis creates a large moment arm when the bed is fully raised and if the load being carried should be imbalanced or if it should suddenly shift, the bed may sway violently from side to side and damage the suspension or dumping components. In some instances, the swaying may be severe enough to place the vehicle at risk of tipping over sideways.

When small utility trucks are equipped with dump beds, they can be used to transport and unload a variety of bulk items ranging from large hay bales to tractor wheels to vehicle engines. Such dumps beds, however, are usually not self-loading. As a result, items which because of their size or bulk cannot be hand loaded onto the bed require the assistance of a forklift, tractor or similar mechanism. Often, however, such assistance is unavailable or inconvenient and the usefulness of the vehicle is limited accordingly. A need has thus developed for a dump bed which is more stable and less expensive than those currently available and which can be more easily loaded. These features would be particularly desirable in a dump bed which could be used with small utility vehicles such as pickup trucks.

SUMMARY OF THE INVENTION

It is an object of this invention to provide a vehicle such as a pickup truck with a dump bed assembly having a bed which can be elevated from a generally horizontal position to a fully upright position to facilitate unloading of material from the bed and to also facilitate loading of material onto the bed.

It is another object of this invention to provide a vehicle with a dump bed assembly having a bed that can be elevated to a 90 degree angle using a small to intermediate stroke cylinder so that expensive multi-stage cylinders or cylinders having a long stroke do not have to be utilized.

It is yet another object of this invention to provide a pickup truck or similar small utility vehicle with a dump bed assembly that is generally self-contained so that it can be easily and quickly installed on the vehicle.

It is also an object of this invention to provide a pickup truck with a self-contained dump bed assembly that utilizes its own power source so that it does not require connection to the vehicle main engine.

It is a further object of this invention to provide a pickup truck with a dump bed that pivots about an axis that is spaced below the dump bed so that greater stability is achieved when the dump bed is elevated.

To accomplish these and other related objects, a vehicle is provided with a dump bed assembly comprising:

a subframe having an arm extending downwardly at a rear portion thereof and a crossbeam extending transversely at an intermediate portion;

a bed overlying said subframe and including a downward extension pivotally connected to said arm at a position spaced below a plane in which said bed lies; and an extensible cylinder connected at a forward end to said subframe crossbeam and at a rear end to said bed, extension of said cylinder causing the bed to pivot upwardly from a horizontal position, said bed being returned to the horizontal position with retraction of the cylinder, said cylinder extending at an acute angle to the horizontal when the bed is in the horizontal position.

The placement of the pivot axis of the bed below the plane of the bed allows the cylinder to be placed at an acute angle and still achieve the leverage required to lift the bed off of the subframe. Because the cylinder has a low profile when placed at an acute angle, it can be located towards the back of the bed where a given cylinder stroke carries the bed through a greater arc of motion than if the cylinder were forwardly located.

BRIEF DESCRIPTION OF THE DRAWINGS

In the accompanying drawings which form a part of the specification and are to be read in conjunction therewith and in which like reference numerals are used to indicate like parts in the various views:

FIG. 4 is a fragmentary forward elevational view of the rear portion of the pickup truck taken in vertical section along line 4—4 of FIG. 3 in the direction of the arrows and shown on an enlarged scale;

FIG. 5 is a fragmentary side elevational view of the rear portion of the pickup truck showing the bed elevated to an intermediate position and with portions broken away for purposes of illustration;

FIG. 6 is a fragmentary side elevational view of the rear portion of the pickup truck and similar to the view shown in FIG. 5 but with the bed lowered to its normal horizontal position; and FIG. 7 is a fragmentary end elevational view of the dump bed in a fully raised position and showing an attachment which may be used to spear a large bale of hay which is represented by broken lines.

DESCRIPTION OF THE PREFERRED EMBODIMENT

Figure 1:
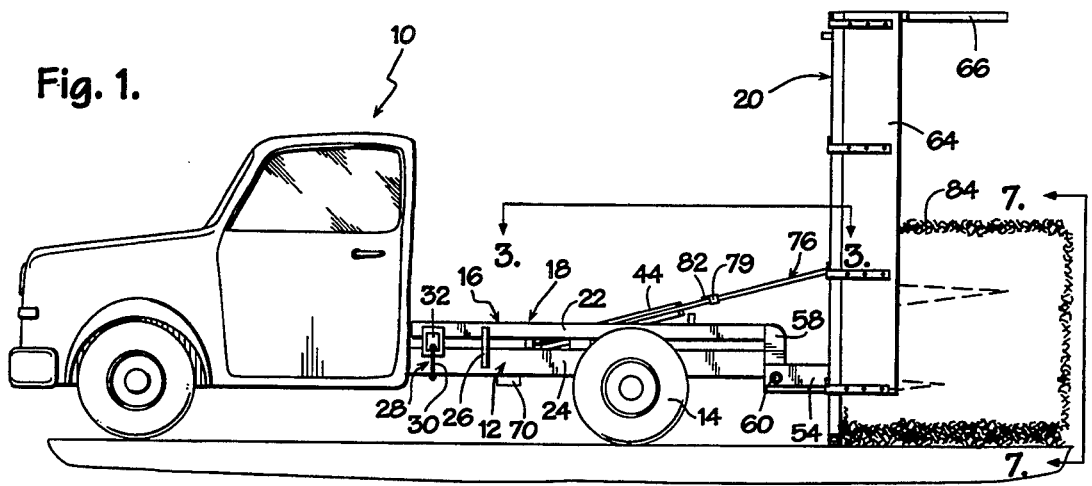
FIG. 1 is a side elevational view of a pickup truck or small utility truck supplied with a dump bed made in accordance with the present invention, the bed being shown elevated to a 90 degree angle to load a large bale of hay.

Referring now to the drawings in greater detail, and initially to FIGS. 1-6, a vehicle in accordance with the present invention is represented broadly by the numeral 10. Vehicle 10 is a small utility vehicle such as a pickup truck having its standard bed removed to expose the underlying vehicle frame 12 and rear wheels 14. To simplify the illustration of the vehicle 10, the leaf springs and other standard components of the vehicle suspension are not shown in the drawings.

The vehicle 10 includes a generally self-contained dump bed assembly 16 which is suitably mounted to the vehicle frame 12. The dump bed assembly 16 comprises a subframe 18 and a bed 20 which is pivotally connected to the subframe 18. The subframe 18 includes spaced apart side beams 22 that extend longitudinally and generally overlie longitudinal beams 24 of vehicle frame 12. The side beams 22 are preferably box beams to provide the necessary strength and rigidity but other types of material can be used if desired.

The side beams 22 of the subframe 18 are securely fastened to the longitudinal beams 24 by suitable connectors 26 which overlap and are welded or otherwise suitably secured to the beams 22 and 24. A forward harness 28 is also used to join beams 22 and 24. As can best be seen in FIG. 4, each harness 28 comprises upright bolts 30 that are connected at their upper ends to mounts 32 welded to the subframe beams 22. The lower ends of the bolts 30 are joined together by a metal flat 34 which underlies the longitudinal beam 24. When nuts 36 carried on the bolts 30 are tightened, the metal flat 34 is brought into contact with and bears against the bottom side of the longitudinal beam 24 to prevent relative movement between the beams 22 and 24. Suitable spacers (not shown) can be provided to maintain a desired separation between the longitudinal beams 24 and the overlying subframe side beams 22.

Figure 3:
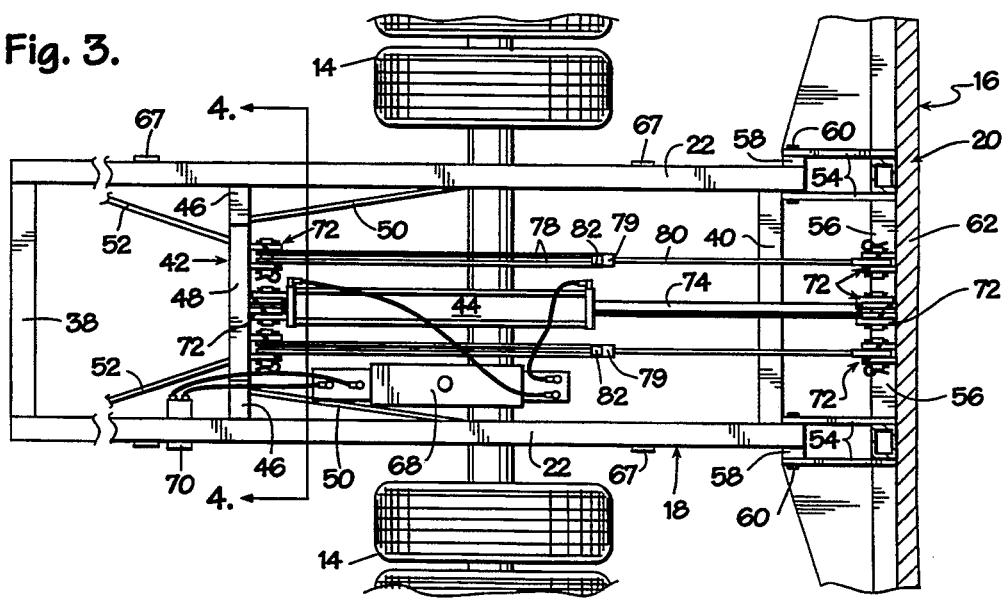
FIG. 3 is a fragmentary top plan view of the rear portion of the pickup truck with the bed elevated to show the actuating cylinder and other components controlling the pivoting movement of the bed, the view being taken in horizontal section along line 3—3 of FIG. 1 in the direction of the arrows.

Turning particularly to FIG. 3, the dump bed assembly subframe 18 further includes a forward crossbeam 38 and rear crossbeam 40 which are connected to and lie generally in the same plane as the side beams 22. An intermediate crossbeam 42 also extends between the side beams 22 and mounts one end of a cylinder 44 that is utilized to effect raising and lowering of the bed 20.

The crossbeam 42 includes two stub members 46 that are welded or otherwise secured to the inner faces of the side beams 22. Another member 48 is positioned in a plane underlying the stub members 46 and is welded to the undersides thereof. Construction of the crossbeam 42 in this manner allows the forward end of the cylinder 44 to be positioned below the side beams 22 and just above the longitudinal beams 24 of the vehicle frame 12. One pair of braces 50 extend rearwardly and another pair of braces 52 extend forwardly from the crossbeam member 48 to the side beams 22 to further stabilize the crossbeam 42.

As is best shown in FIG. 5, the bed 20 is connected to the subframe 18 by pairs of extensions 54 which are welded to the framed understructure 56 of the bed. One of each pair of extensions 54 extends downwardly along the outer faces of arms 58 which are welded to and extend downwardly from the rear end of both subframe side beams 22. The arms 58 can also be connected to the vehicle frame longitudinal beams 24 for additional support. The other of each pair of extensions extends along the inner face of the longitudinal beams 24. Each pair of extensions 54 and associated arm 58 are joined together at their lower ends by a pivot pin 60 which allows the extensions 54 and the bed 20 to pivot about a transversely extending horizontal axis that runs along the pivot pins. It can thus be appreciated that the extensions 54 operate as levers or crank arms to facilitate the lifting of bed 20 by cylinder 44.

Notably, the pivot pins 60 are located at or below the bottom edge of vehicle frame longitudinal beams 24 to bring the pivot axis of the bed 20 closer to the ground. Location of the pivot axis in this manner increases the stability of the bed 20 when it is pivoted upwardly and reduces the opportunity for load imbalances to cause the vehicle 10 to tip sideways. In addition, as was previously mentioned, the bed 20 is more easily raised and lowered because of the placement of the pivot axis a substantial distance below the plane of the bed.

The bed 20 comprises the framed understructure 56 which supports a flat platform 62. Side rails 64 are positioned along the sides of the platform 62 and a forward shield 66 is positioned at the front edge of the platform 62 to protect the vehicle rear window. If desired, the side rails 64 can be hingedly mounted so that they can be swung downwardly from their upright positions. It will be appreciated that the bed 20 can comprise other configurations and may include additional components such as stock racks and the like. A plurality of upright members 67 carried on the side beams 22 engage portions of the framed understructure 56 of bed 20 to reduce side to side movement of the bed 20 when supported on the subframe 18.

The cylinder 44 which is used to raise and lower bed 20 is preferably a double-acting hydraulic cylinder powered by a hydraulic power unit 68. The power unit 68 operable by a 12 volt battery (not shown) is mounted on the subframe 18 and is operable by a control unit 70 that is also mounted to the subframe 18 at a location which is easily accessible to the vehicle operator. Powering the cylinder 44 in this manner allows the dump bed assembly 16 to be essentially self-contained and self-powered and eliminates the need to utilize the vehicle engine to supply the necessary power. It can be appreciated that this feature is particularly desirable because it also eliminates the need to install a vehicle engine driven hydraulic unit and route the hydraulic lines from the engine compartment to the dump bed.

Because the dump bed assembly 16 has its own self-contained power source, the procedures required for installation of the dump bed assembly are greatly simplified.

Remarkably, the bed 20 can be pivoted through an angle of 90 degrees from its normal horizontal orientation to a fully upright position as shown in FIG. 1 with the extensions 54 providing the clearance required to fully raise the bed 20. This range of motion is achieved through the unique mounting arrangement for the cylinder 44 and the use of downwardly extending arms 58 and extensions 54 which lower the pivot axis of the bed 20. Instead of being mounted upright at the forward end of the bed 20, the cylinder 44 is inclined rearwardly so that it lies nearly flat and can be positioned rearwardly where a given cylinder stroke carries the bed through a greater angle of movement than if the cylinder were forwardly positioned.

The forward end of the cylinder 44 is pivotally fastened by a clevis mounting 72 to the rear face of the intermediate crossbeam member 48. The cylinder 44 has a piston rod 74 that is secured at its free end to the framed understructure 56 of bed 20, also by a clevis-type mounting 72. As can best be seen in FIG. 6, when the bed 20 is fully lowered, the connection between the free end of the piston rod 74 and the framed understructure 56 of the bed is located rearwardly of the rear axle. Despite having the piston rod 74 connection located this close to the rear end of the bed 20, the cylinder 44 can readily lift the bed 20 because the pivot pins 60 about which the bed rotates are located well below the plane in which the connection lies. As can be seen in FIG. 5, the trailing top corner of the arms 58 are rounded to facilitate the initial lifting of the bed 20 off of the subframe 18.

It has been found that placing the cylinder 44 at a slight angle from the horizontal, preferably an angle of less than 20 degrees, will lessen the force required to initiate the lifting of bed 20 while still providing the low cylinder profile which enables the rear placement of the cylinder 44 without impeding the ground clearance of the vehicle 10. This inclined orientation is achieved by positioning crossbeam member 48 below the plane of the side beams 22 that support the bed 20 in the lowered position.

The crossbeam member 48 also serves to mount one end of a pair of motion limiters 76 that prevent the bed 20 from rotating beyond 90 degrees. Each motion limiter 76 comprises a pair of elongated flat rods 78 that are mounted at a forward end by clevis-type mounting 72 to the crossbeam member 48. The paired rods 78 are spaced apart and mount a collar 79 at the end remote from the crossbeam member 48. A single rod 80 is mounted at a rear end to the framed understructure 56 of the bed 20 by clevis mounting 72. The single rod 80 extends through the collar 79 and is received within the spacing between the paired rods 78 and is free to slide longitudinally along those rods 78. A stop guide 82 is securely mounted to the forward end of the single rod 80 and rides along the top of the paired rods 78 as the single rod is extended and retracted with pivoting of bed 20. When the bed 20 is fully rotated, preferably at an angle of 90 degrees, the stop guide 82 contacts the collar 79 to prevent further movement of the single rod 80. The rods 78 and 80 are thereby locked together to prevent overrotation of the bed 20 and resulting damage to the cylinder 44. It can thus be seen that the motion limiters 76 greatly reduce the stresses that might otherwise be transferred to the cylinder 44.

The use of arms 58 and extension 54 to lower the pivot axis of the bed 20 provides the leverage necessary to permit the cylinder 44 to extend rearwardly with the free end of the piston rod 78 connected at a rear portion of the bed 20. Notably, this orientation and positioning of the cylinder 44 allows the cylinder to move the bed through a 90 degree arc of travel with only a relatively short cylinder stroke in comparison to the stroke required if the cylinder 44 were mounted upright at the forward end of the bed 20..This allows less expensive cylinders to be utilized while still achieving a greater range of travel for bed 20 than is typically available in conventional dump bed constructions. In one particularly preferred embodiment, a Monarch brand model number CT3530 cylinder having a 30 inch stroke and a 3.5 inch bore, powered by Monarch Dyna-Ramic brand M-642 hydraulic power unit, is used to lift the bed 20 to the upright position and return it to the lowered position. Although it will be appreciated that the dimensions can be varied as desired, the above-mentioned cylinder is particularly well suited to lifting the bed 20 when the forward end of the cylinder 44 is positioned approximately 61 inches from a vertical plane passing through the pivot pins 60, and the pivot pins 60 are located approximately 13.75 inches below the platform 62 of bed 20. It will also be appreciated that other types of cylinders could be utilized if desired.

Figure 2:
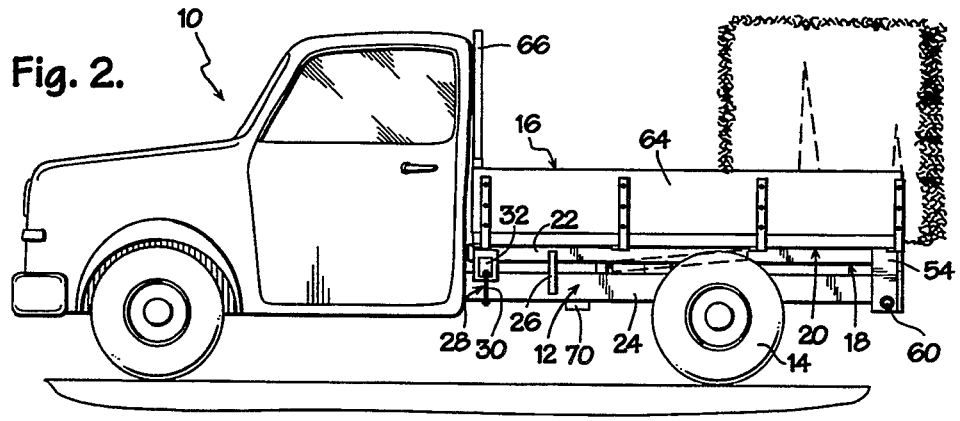
FIG. 2 is a side elevational view of the pickup truck shown in FIG. 1 but with the bed being shown lowered to its normal horizontal position.

The ability of the bed 20 to be raised to an upright position extending perpendicularly to the ground surface facilitates dumping of material carried on the bed 20. In addition, loading of certain types of material can be readily achieved while the bed 20 is in the upright position. As an example, large bales 84 of hay can be loaded onto the bed using an attachment 86 as illustrated in FIG. 7 that carries a plurality of elongated tines 88. The attachment 86 can be secured to the bed 20 in any suitable fashion, such as by attaching it to a hitch ball (not shown) which is recessed below the bed top surface and is accessible by lifting a hatch 90. The attachment 86 is utilized by backing the vehicle 10 up to the bale 84 and spearing the bale 84 with tines 88 as shown in FIG. 1. The double acting cylinder 44 is then activated to retract the piston rod 74 and cause the bed 20 to be lowered to its normal horizontal position as shown in FIG. 2.

Other methods can also be used to load materials onto the elevated bed 20. As another example, a stack of square bales can be loaded by backing the vehicle against the stack. The bales can then be tied to the bed 20 and the bed lowered to its normal position. A removable extension 92 is preferably used when loading bales in this manner to span the distance between the bed 20 and the ground.

As a still further example of the versatility of the dump bed assembly 16 achieved as a result of the ability of the bed to be raised to an upright position, items such as vehicle engines can be loaded onto the bed by attaching a block and tackle or similar device to the forward end of the bed 20 or to the shield 66. The engine or other item can then be elevated by the block and tackle and held in place as the bed 20 is lowered.

It can thus be appreciated that the dump bed assembly 16 can be used for many different loading operations that conventionally would require the use of a forklift, tractor or other device. As a result of this versatility, the vehicle 10 can be used for a wide variety of loading, transport and other functions frequently required on a farm as well as at construction sites and the like.

From the foregoing, it will be seen that this invention is one well adapted to attain all the ends and objects hereinabove set forth together with other advantages which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A vehicle having a dump bed assembly mounted on a frame of the vehicle, said dump bed assembly comprising:
   a subframe mounted on the vehicle frame and having a pair of spaced apart arms extending downwardly at a rear portion of the subframe and a crossbeam extending transversely at an intermediate portion of the subframe between longitudinally extending side beams, said crossbeam having a portion that lies in a plane below that of the side beams;
   means for coupling the subframe with the vehicle frame;
   a bed overlying said subframe and movable between a horizontal position with the bed resting on said subframe side beams and an elevated position with the bed pivoted off of the subframe side beams, said bed including a pair of downward extensions pivotally connected to said arms at a position spaced below a plane in which said bed lies; and
   an extensible cylinder connected at a forward end to said subframe crossbeam at said portion that lies in a plane below that of the side beams and at a rear end to said bed, extension of said cylinder causing the bed to pivot upwardly from the horizontal position to the elevated position, said bed being returned to the horizontal position with retraction of the cylinder, said cylinder extending at an acute angle to the horizontal when the bed is in the horizontal position.

2. The vehicle as set forth in claim 1, wherein said bed is upwardly pivotable to an upright angle of approximately 90 degrees to the horizontal by extension of said cylinder.

3. The vehicle as set forth in claim 2, wherein said cylinder extends at an acute angle to the horizontal when the bed is at said upright angle.

4. The vehicle as set forth in claim 3, including a motion limiter connected between the bed and the subframe for preventing pivoting of the bed beyond said upright angle.

5. The vehicle as set forth in claim 4, including a power unit mounted on said subframe and connected to said cylinder for causing extension and retraction thereof.

6. The vehicle as set forth in claim 5, including a control unit coupled with said power unit to control operation thereof, said control unit being mounted on said subframe.

7. A dump bed assembly comprising:
   a subframe having a pair of spaced apart arms extending downwardly at a rear portion of the subframe and a crossbeam extending transversely at an intermediate portion of the subframe between longitudinally extending side beams, said crossbeam having a portion that lies in a plane below that of the side beams;
   means for connecting the subframe to a frame of a vehicle chassis;
   a bed overlying said subframe and movable between a horizontal position with the bed resting on said subframe side beams and an elevated position with the bed pivoted off of the subframe side beams, said bed including a framed understructure and downward extensions connected by pivot pins to said arms to permit rotation of said bed about said pivot pins, said pivot pins being spaced below a plane in which said bed lies;
   an extensible cylinder connected at a forward end to said subframe crossbeam at said portion that lies in a plane below that of the side beams and at a rear end to said bed, extension of said cylinder causing the bed to pivot upwardly from the horizontal position to an upright position extending at an angle of 90 degrees to the horizontal position, said bed being returned to the horizontal position with retraction of the cylinder, said cylinder extending at an acute angle to the horizontal when the bed is in the horizontal position; and
   a motion limiter connected between said bed and said subframe to prevent said bed from pivoting beyond said upright position.

8. The dump bed assembly as set forth in claim 7, wherein said cylinder extends at an acute angle to the horizontal when the bed is in said upright position.

9. The dump bed assembly as set forth in claim 8, including a power unit mounted on said subframe and connected to said cylinder for causing extension and retraction thereof.

10. The dump bed assembly as set forth in claim 9, including a control unit coupled with said power unit to control operation thereof, said control unit being mounted on said subframe.

11. A dump bed assembly comprising:
   a subframe comprising longitudinally extending side beams and a crossbeam extending between the side beams, said subframe having a pair of spaced apart arms extending downwardly at a rear portion of the subframe;
   means for connecting said subframe to a frame of a vehicle chassis;
   a bed overlying said subframe and movable between a horizontal position with the bed resting on said subframe side beams and an elevated position with the bed pivoted off of the subframe side beams, said bed including a pair of downwardly extending extensions at a rear portion of the bed, one of said extensions being positioned adjacent one of said subframe arms and the other extension being positioned adjacent the other of said subframe arms;
   pivot pins connecting the lower portions of said bed extensions to said subframe arms to permit rotation of said bed about an axis along said pivot pins;
   a double acting cylinder connected at a forward end to said subframe crossbeam in a plane below that of the side beams and at a rear end to said bed, whereby extension of said cylinder causes the bed to pivot upwardly from the horizontal position to an upright position with the bed extending at an angle of 90 degrees to the horizontal position, said bed being returned to the horizontal position by retraction of the cylinder; and a motion limiter connected between said bed and said subframe to prevent said bed from pivoting beyond said upright position, said motion limiter comprising:

a pair of elongated and spaced apart flat rods;

a collar positioned at one end of said pair of rods;

a single elongated flat rod positioned between said pair of rods and extending through said collar, said single rod being movable longitudinally with respect to said pair of rods;

a stop positioned at one end of said single rod to engage said collar and prevent further longitudinal movement of said single rod with respect to said pair of rods, wherein an opposite end of the single rod is coupled with said subframe or bed and an opposite end of said pair of rods is connected to the other of said subframe or bed.

12. The dump bed assembly as set forth in claim 11, wherein said cylinder extends at an acute angle to the horizontal when the bed is in the horizontal position.

13. The dump bed assembly as set forth in claim 12, wherein said cylinder extends at an acute angle to the horizontal when the bed is in said upright position.

14. The dump bed assembly as set forth in claim 13, including a power unit mounted on said subframe and Connected to said cylinder for causing extension and retraction thereof.

15. The dump bed assembly as set forth in claim 11, including a control unit coupled with said power unit to control operation thereof, said control unit being mounted on said subframe.

16. The dump bed assembly as set forth in claim 12, wherein said acute angle is an angle less than 20 degrees.

* * * * *